J. P. DOVEL.
GAS PURIFIER.
APPLICATION FILED JULY 25, 1908.
1,001,738.
Patented Aug. 29, 1911
2 SHEETS—SHEET 1.
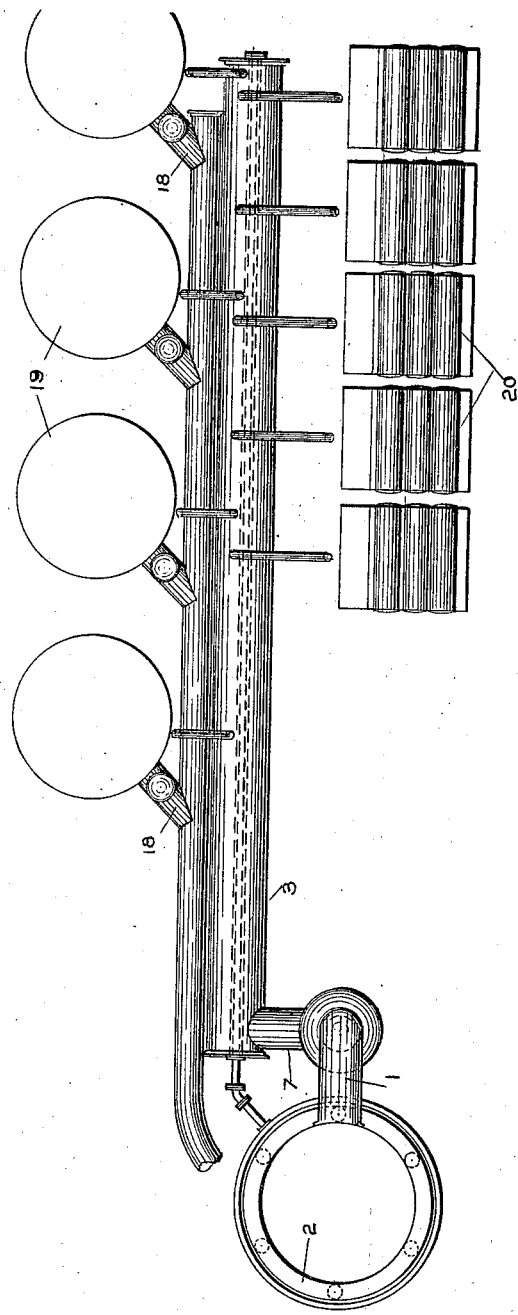
WITNESSES
INVENTOR
JAMES P. DOVEL.
ATTORNEY.

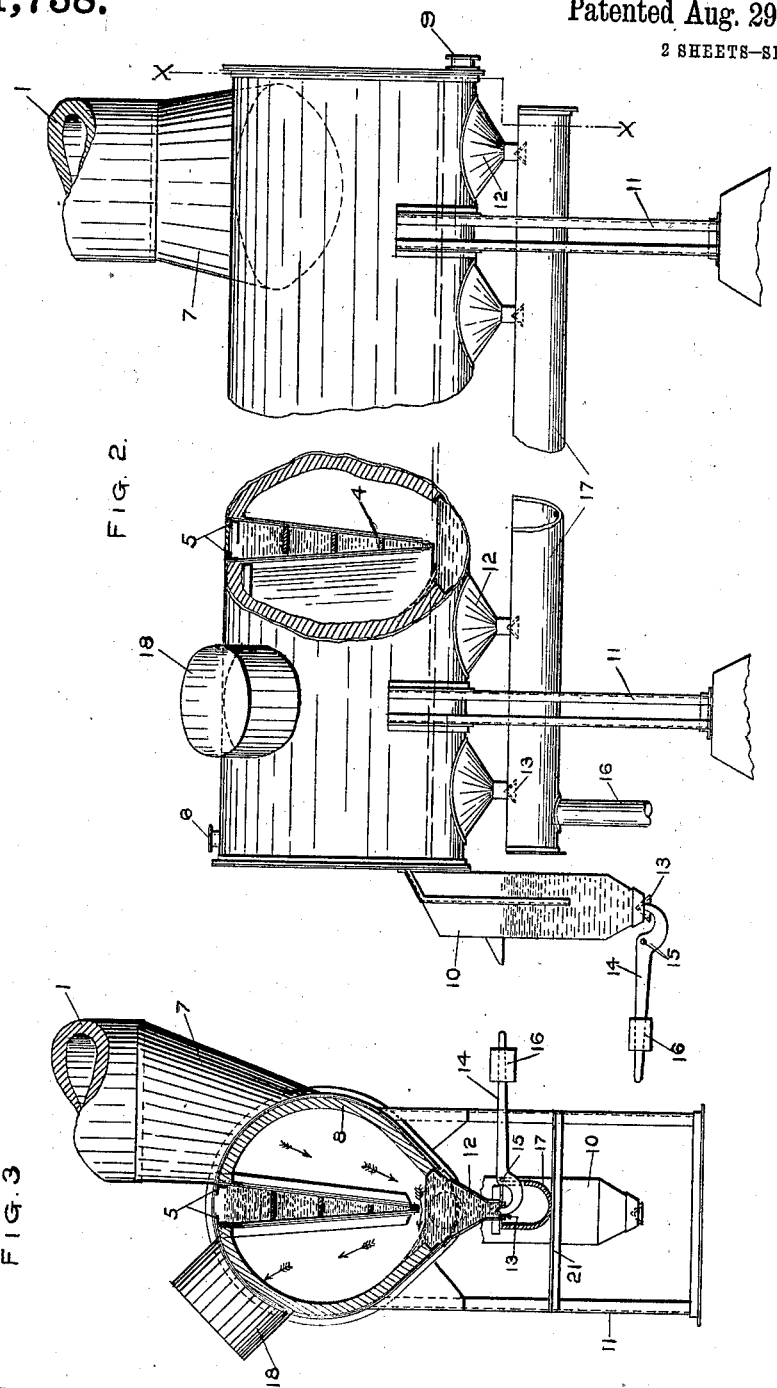

UNITED STATES PATENT OFFICE.

JAMES PICKERING DOVEL, OF NORTH BIRMINGHAM, ALABAMA.

GAS-PURIFIER.

1,001,738.

Specification of Letters Patent.   Patented Aug. 29, 1911.

Application filed July 25, 1908. Serial No. 445,414.

*To all whom it may concern:*

Be it known that I, JAMES P. DOVEL, a citizen of the United States, residing at North Birmingham, in the county of Jefferson and State of Alabama, have invented new and useful Improvements in Gas-Purifiers, of which the following is a specification.

My invention relates to an apparatus for purifying gases, and particularly blast furnace gases before using the same in the gas stoves or boiler furnaces.

The object of my invention is to provide an apparatus which will most effectively clean the gas with a minimum quantity of water and without interfering with the free flow of the gas through the apparatus or causing any material loss of its heat units. With these objects in view I have conceived that if the gas be caused to flow in a thin sheet around a baffle or partition so as to make a sharp turn, the cinders, and foreign matter in the gas will become centrifugally concentrated in the outer stratum or surface of the gas, this concentration taking place after the gas has turned an angle of approximately 90° or rounded the baffle. If then this thin sheet of gas, with its foreign matter concentrated in its outer surface, is caused to sweep over a sheet of water, it will most effectively rid itself of such foreign matter and flow from the cleaner freely and without appreciable loss of heat.

I have discovered that if a scum is allowed to accumulate upon the surface of the water in the cleaner, it will materially interfere with the action of the water in catching and holding the foreign matter in the gas. This scum will form very rapidly upon water exposed for any time to the gases, and, in fact, will often form almost instantaneously. To avoid this objectionable condition and for the purpose of making all the water used effective in cleaning the gases, I propose to use a shallow constantly flowing stream of water, thereby presenting continually a fresh surface of water to catch the foreign matter and effecting a great saving in water consumption.

It is only the surface of the water in the cleaner that is effective in my type of gas cleaner, and therefore the deeper the stream the greater the unnecessary waste of water and it may be said that the quantity of water required for gas cleaners has prevented their extensive use in many districts. To secure a shallow stream which will present the maximum surface of water at the desired place, I have contracted the bottom of my cleaning casing and provided on the outlet side a straight inclined wall disposed substantially at right angles to the plane of flow of the gases as they round the baffle. The object of this arrangement is to present a flat surface over which the small stream of water in the bottom of the casing will be spread out by the pressure of the gases as they impinge upon it, the area thus covered varying with the pressure of the gas so that the water automatically adjusts itself to the conditions of the gas to be treated. In my apparatus the shallow flowing stream may be said to line the casing at the point where the maximum wear would result from the cinders and foreign matter, were the same allowed to strike the metal. The stream of water is caused to flow with sufficient velocity to carry with it the foreign matter it collects, although when the casing is elongated, as hereinafter described, pockets may be provided for collecting the cinders and permitting same to be removed from points along the casing.

A further object of my invention is to provide a purifier which will afford the maximum opportunity for the gravity deposit of cinder, dust or foreign matter in the gas, thus functioning as a dust catcher, and which will pass the gas in a thin sheet above a body of water with but little practical interference with the free flow of the gases.

A further object of my invention is to construct the purifier so that it will form the whole or a large portion of the gas main such as now used to connect the stoves or boilers with the downcomer from the furnace.

An important feature of my invention lies in the fact that the direction of flow of the gas in the purifier is but slightly changed, the gas flowing through the main at an acute angle from point of inlet under a baffle to the discharging chamber.

Another feature is, that by conducting the purification of the gases in a main similar to those now used merely to convey the gases to their work, I secure not only a most economical construction but also, what is of the greatest importance, a minimum radiation loss over present practice.

A further object of my invention is to provide a means for economically carrying off the solid matter that may be extracted from the gas.

In addition to the foregoing, my invention consists in the improved details of construction and arrangement of parts hereinafter more fully described and claimed, reference being had to the accompanying drawings, in which:—

Figure 1 illustrates a plan view of my improved gas purifier connecting the downcomer from the furnace to the several stoves and boilers which are supplied with the purified gas. Fig. 2 is a side elevation of the gas purifier broken away and showing the two end portions of the casing. Fig. 3 is a vertical sectional view along the line $x$—$x$ of Fig. 2.

Similar reference numerals refer to similar parts throughout the drawings.

As illustrated in the drawings, my improved gas purifier is connected to the downcomer 1 of the furnace 2, and consists of an elongated oval or egg-shaped casing 3 subdivided into two longitudinal compartments by a hollow water cooled deflector or baffle wall 4 formed by metal plates joined along their bottom edges in a straight line and separating as they approach the top of the main to which they are suitably connected by angle irons 5, the plates being braced together at intervals by staybolts. I fill the space between these plates with water, through an opening 6, thus giving a water cooled baffle or deflector, which prevents it warping or bulging under the action of the gases which enter the compartment on one side of the baffle, hereinafter referred to as the receiving compartment, through the pipe 7 connected to the downcomer 1. The baffle 4 extends to a point near the bottom of the casing 3, which latter is lined on the inside with fire brick or other protective substance 8. At the receiving end of the casing I provide a water inlet port 9, through which a supply of water is introduced into the casing and caused to flow lengthwise thereof to the other end where it is drawn off through a trap 10, which is water sealed to prevent the escape of the gases. The baffle 4 extends down to within a few inches of the normal level of the water, this distance being such as to give an area of clearance between the water and the baffle substantially equal to the inlet area of the pipe 7. The casing is mounted on metal supports 11 and disposed at an inclination sufficient to provide for a flow of the water therethrough and carry off with the water a large percentage of the impurities collected thereby from the gases. In practice, the flow of the gases transversely of the casing will cause them to impinge against the stream of water and, since the gases have a normal speed of approximately 600 feet a minute, it follows that the stream of water will be forced to the left so that it forms a shallow flowing stream which extends up along the bottom side walls of the left hand compartment. I propose to use water for cleaning in such a manner that a small shallow stream thereof will act as effectively as a large body of still water, or an unnecessarily deep body of flowing water, in catching the dust, and also have the additional and important function of carrying out with it the dust which it catches. My apparatus will also function as a dust catcher in that the heavier particles of ore, coke and other impurities entering the right hand compartment will drop to the bottom thereof by gravity as the gases flow lengthwise of the casing and as there may be a considerable quantity of impurities in the gas, I make additional provision for relieving the casing of these heavier impurities and to this end I provide the bottom of the casing at intervals with depressions or dust collecting hoppers 12 which are closed at their lower ends by bells 13 connected to and held in position to close the hoppers by levers 14 pivotally mounted on pins 15 and having counterbalance weights 16 at their outer ends. Below these several hoppers I arrange an inclined trough 17 which extends the whole length of the gas purifier and is disposed at such an inclination that, when the bells are lowered to permit the discharge of the solid matter which has accumulated in the hoppers above, such matter and the water which is discharged with it will fall into the trough and flow to the lower end thereof, from which point it is carried off to any suitable dump through the pipe 16. The pins 15 are preferably supported by the trough 17.

At any desired points along the side of the compartment which receives the gas from the receiving compartment, I provide outlet ports 18 to lead the purified gases to the stoves 19 or boilers 20 as the case may be. I also provide the trap 10 with a hopper and bell similar to 12 and 13 to enable it also to be cleaned.

In operation, the gases flow through the downcomer and enter the purifier at one end of the receiving compartment and passing under the baffle 4, they enter the other compartment from which they pass to the stoves or other use. In doing this the gases flow on an average a distance equal to one-half of the length of said compartment, thereby giving a considerable opportunity for the gravity deposit of the cinder and heavier particles of dust suspended therein. These heavier particles work down along the lower right hand bottom portion of the casing and accumulate in the hoppers from which they are cleaned out at intervals in the manner described. The gases as thus partially purified will then pass from the receiving compartment to the left hand compartment by flowing in a thin sheet under the lower edge of the baffle 4. In being thus deflected the thin sheet of gases are caused to impinge against the shallow flowing stream of water which, due to the action of the gases, is spread over the left hand inclined wall of the casing, thereby forming a shallow flowing sheet of water of considerable surface over which the gases, also in a thin sheet, flow, passing in a direction at angles to the direction of flow of the water, so that an effective sweeping contact between the flowing sheets of gas and water is obtained without, however, causing the gases to pass into or through the water. The lighter impurities are caught by the flowing stream of water and are carried out with it. This gives an exceedingly effective purification of the gas without retarding its flow or causing it to pass through a body of water with the objectionable features which arise therefrom. It will be evident that the casing 3 may be so extended as to form in effect the gas main from the downcomer to the several points of consumption for the purified gas, thereby enabling the purifier to be installed at but very little more cost than the present large mains which are used for this purpose and to be operated with but little greater radiation losses. It will also be observed that all of the cinder and solid matter extracted from the gas is carried off by gravity, thus effecting a material saving in furnace operation. It will also be evident that the apparatus will present a minimum interference to the flow of the gases since the opening between compartments may be adjusted to the particular needs of different installations and may be regulated by increasing the volume of the stream of flowing water and thereby reducing the clearance between its level and the lower edge of the baffle.

The contracted nature of the bottom of the casing is of advantage where an economy of water consumption is required, but the more important feature is the provision of the wall on the outlet side of the casing having a requisite inclination and juxtaposition to the baffle to cause the water to be spread over it in a thin sheet when the flowing gases impinge thereon. Where the gases have been partially cleaned by being passed through one or more dust catchers before entering the receiving compartment, the flow of water alone will be sufficient to clean and carry off the impurities caught thereby, and in such cases the hoppers may be dispensed with. The advantage which I have derived from the centrifugal accumulation of the dust in the lower stratum of the flowing stream of gas is of considerable importance and to obtain the same it is obviously necessary that the gases should not enter the water but should pass through a clearance left between the water and the baffle, and also that the turn which the gases make should be relatively sharp, thereby effecting the centrifugal accumulation of the dust.

Having thus described my invention, what I claim as new and desire to secure by Letters Patent, is:—

1. In a gas cleaning apparatus, a casing having an inclined water way and means to cause a stream of water to flow along said way, a baffle in the casing which is disposed above said stream in the direction of its flow with its bottom edge above the water line of the stream, and means to cause a body of gas to flow through the casing and to pass under said baffle and sweep across the surface of the stream of water, substantially as and for the purposes described.

2. In a gas cleaning apparatus, a casing having gas and water inlet and outlet ports and having a stream of water flowing therethrough, baffle means above said stream to spread the gas flowing between it and said stream into a thin sheet, a portion of the casing adjacent to said stream co-acting with the flowing gases to produce an extended shallow water surface over which the gases sweep with surface contact only, and means to cause the water forming said water surface to constantly flow through said casing, substantially as described.

3. In a gas cleaning apparatus, a casing having gas inlet and outlet ports and a partition so disposed that the gas in passing through said casing flows in a thin sheet around said partition, a substantially straight inclined wall against which said gases impinge after rounding said partition, and means to provide a constantly changing body of washing fluid along the lower portion of said wall and below said partition, substantially as described.

4. A gas cleaning apparatus comprising a casing divided into gas inlet and outlet compartments by a partition under which the gases are caused to flow, means to cause a stream of water to flow along under said partition leaving a clearance for the flow of the gases, and means to increase the surface area of said water which means involve a contracting of the bottom of the casing along which the water tends to flow, and the provision of a sharply inclined side wall on the outlet side of the casing, which wall is juxtaposed to the said partition and inclined away therefrom so that the water is driven along up said surface by the gases, substantially as described.

5. A gas washer comprising a casing, a deflector therein around which the gas flows unobstructedly in a thin sheet, walls of said casing which cause said sheet of gas to make a sharp turn in rounding said deflector, and means to line with a shallow sheet of cleaning liquid that portion of said walls which receives the impact of the gas as it rounds the baffle.

6. In a gas cleaning apparatus, a casing having a contracted bottom, means to cause a stream of water to flow along said bottom, a partition wall which overhangs said bottom leaving an elongated clearance between its lower edge and said stream of water, said casing having inlet and outlet openings for the gases on opposite sides of said partition and having a steeply inclined wall leading up from said bottom and juxtaposed to said partition so that the stream of water is spread out over its lower portion by said gases, substantially as described.

7. A gas washing device comprising a casing having its lower inclined side walls angularly disposed to form a trough-like bottom for containing the washing liquid, a partition thereabove and positioned to provide a gas passage above the liquid, and adapted to so direct the gas flow as to spread out the washing liquid in a thin layer upon one of said side walls.

8. A gas washing device comprising a casing having its lower inclined side walls angularly disposed to form a trough-like bottom for containing the washing liquid, a partition thereabove and positioned to provide a gas passage above the liquid, and adapted to so direct the gas flow as to spread out the washing liquid in a thin layer upon one of said side walls, and means for creating a flow of washing liquid through the casing in a shallow stream lengthwise of said partition.

9. In an apparatus for cleaning gas, a casing having a contracted bottom and gas inlet and outlet ports near its top, a partition interposed between said ports and extending down to a point near the contracted bottom to cause the gases to flow down and with a sharp turn pass under said partition and flow up to said outlet port, and means to maintain a shallow surface of washing fluid over that portion of the bottom of the casing against which the foreign matter in the gases would impinge when thrown to the outer surface thereof by centrifugal force generated in rounding said partition, substantially as described.

10. A gas washer comprising a casing, the upper cross section of which is described by the greater part of a large circle and the bottom part by the lesser part of a relatively smaller circle, the parts being joined by inclined side walls which are common tangents to said circles, means to cause a stream of water to flow through said trough, and a baffle to deflect the gases on said stream of water, while leaving a substantially uniform clearance between said baffle and stream of flowing water, substantially as described.

11. In an apparatus for cleaning furnace gases, means serving as a conduit for the gases from the furnace to the points of use and provided with a longitudinal partition extending from the top to a point near the bottom, means to pass a shallow flowing body of water through said pipe and maintain its level slightly below the lower edge of the said division wall, the inlet opening for the gas into said pipe being disposed on one side of said partition and the outlet opening or openings on the other side of said partition so that said gas flows transversely of the pipe and in a direction at angles to the flow of the water, and means to remove the solid matter accumulating in the bottom of said pipe at different points throughout the length thereof.

12. The combination with a furnace and its downcomer, of an elongated conduit into which said downcomer discharges and which serves as a means to convey the gases to the points of use, said conduit having its lower walls inclined to form a trough-like bottom and having a flowing body of water in said bottom thereof, a series of valve controlled discharge openings along the bottom for the removal of the solid matter accumulating in said water, and a longitudinal baffle extending from the top to a point near the water level therein and dividing said conduit into two distinct compartments, one of which receives the unpurified gases and the other of which receives the purified gases which become purified in passing under said baffle and over said body of water, the surface area of which is increased by the action of said gases, substantially as described.

In testimony whereof I have hereunto set my hand in presence of two subscribing witnesses.

JAMES PICKERING DOVEL.

Witnesses:
 HOMER WELSH,
 ANNIE L. PEACE.

Copies of this patent may be obtained for five cents each, by addressing the "Commissioner of Patents, Washington, D. C."